United States Patent
Aramaki

(10) Patent No.: US 8,125,446 B2
(45) Date of Patent: Feb. 28, 2012

(54) INPUT DEVICE FOR INPUTTING A SIGNAL INTO AN ELECTRONIC APPARATUS

(75) Inventor: Chitoshi Aramaki, Tokyo (JP)

(73) Assignee: NEC Corporation, Tokyo (JP)

( * ) Notice: Subject to any disclaimer, the term of this patent is extended or adjusted under 35 U.S.C. 154(b) by 627 days.

(21) Appl. No.: 12/301,813

(22) PCT Filed: May 24, 2007

(86) PCT No.: PCT/JP2007/060629
§ 371 (c)(1),
(2), (4) Date: Nov. 21, 2008

(87) PCT Pub. No.: WO2007/138982
PCT Pub. Date: Dec. 6, 2007

(65) Prior Publication Data
US 2010/0245231 A1 Sep. 30, 2010

(30) Foreign Application Priority Data
May 30, 2006 (JP) .................................. 2006-150308

(51) Int. Cl.
*G06F 3/033* (2006.01)
(52) U.S. Cl. ........................................ 345/157; 345/168
(58) Field of Classification Search ........................ None
See application file for complete search history.

(56) References Cited

U.S. PATENT DOCUMENTS 6,243,080 B1 6/2001 Molne
2007/0273649 A1* 11/2007 Matsui et al. ................. 345/162

FOREIGN PATENT DOCUMENTS

| JP | 2001076582 A | 3/2001 |
| JP | 2002196856 A | 7/2002 |
| WO | 2005018222 A1 | 2/2005 |
| WO | 2005019987 A2 | 3/2005 |

OTHER PUBLICATIONS

International Search Report for PCT/JP2007/060629 mailed Jun. 19, 2007.
Supplementary European Search Report for EP 07 74 4063 completed Aug. 7, 2009.

* cited by examiner

*Primary Examiner* — Paul Huber

(57) ABSTRACT

Provided is an input device which has excellent operability by not requiring a finger to be released from a key during operation requiring the finger to shift and preventing the finger from touching a plurality of keys at the same time. A key (12) surrounding a selection key (18) is arranged. On a board (41), four metal domes (14) are arranged at positions corresponding to the four positions, i.e., upper, lower, right and left positions, of the key (12). A touch sensor (13) is arranged on an upper layer above the metal dome (14). The touch sensor (13) is brought into contact with a touch sensor presser (53), and an electrical value (for instance, a resistance value) is changed corresponding to shift of the finger on the key (12). When the key (12) is strongly pressed down, the top of the metal dome (14) is pressed into the substrate (41) side and electricity is carried between contact points (14a, 14b).

8 Claims, 15 Drawing Sheets

INPUT DEVICE FOR INPUTTING A SIGNAL INTO AN ELECTRONIC APPARATUS

This application is the National Phase of PCT/JP2007/060629, filed May 24, 2007, which claims priority of Japanese Patent Application No. 2006-150308, filed on May 30, 2006.

BACKGROUND OF THE INVENTION

1. Field of the Invention

The present invention relates to input devices of electronic apparatuses, more particularly, relates to an input device capable of an input operation by shifting a finger effectively in a continuous circular motion.

2. Related Art

In recent years, it has become possible for an electronic apparatus to store lots of data, therefore, a user of the electronic apparatus searches and selects desired data from lots of data frequently. For example, the user stores lots of music data or image data into a mobile phone, and performs operations such as searching and selecting music data desired to be listened or image data desired to be viewed, frequently. In not only mobile phones but also in other various electronic apparatuses, searching for and selecting of the desired data from lots of data are performed frequently.

When a user selects the desired data, for example, the electronic apparatus displays a list of data and moves a cursor for specifying the data in accordance with an operation by the user. In the case where there are lots of data and a list of all the data cannot be displayed within the display screen, the list of data is scrolled and displayed after moving the cursor to the end of the screen. The user moves the cursor onto the desired data and performs operation for selecting the data.

An input device which enables the operation as described above to be performed is equipped with a mobile terminal apparatus (for example, a mobile phone). FIG. 15 is an illustration diagram showing an example of a conventional input device equipped with a mobile terminal apparatus. In this regard, a display device equipped with the mobile terminal apparatus is omitted in FIG. 15.

As shown in FIG. 15A, the conventional input device includes: a selection key 101 for instructing determination of the selected item; a four-direction key 103 becoming a push-button at its four positions of the top, bottom, right and left; and a touch key 102 for instructing cursor movement by shifting a finger in a continuous circular motion.

FIG. 15B is a cross-section view of the input device taken along the chain double-dashed line shown in FIG. 15A. Metal domes 106, a metal dome 108 and a touch sensor 107 are arranged in a space surrounded by a first housing 111 and a second housing 121 of the mobile terminal apparatus. Further, a key rubber 105 is arranged on the reverse side of key tops of the selection key 101, the touch key 102 and the four-direction key 103. Here, the key top means a member of the keys operated by a finger 130. When the selection key 101 is pressed down, the metal dome 108 corresponding to the selection key 101 is pressed through the key rubber 105. In the result, pressing down of the selection key 101 is detected. Similarly, when any one of four positions of the top, bottom, right and left of the four-direction key 103 is pressed down, the metal dome 106 corresponding to the position is pressed through the key rubber 105. In the result, pressing down of the four-direction key 103 is detected. Further, when the finger 130 is placed on the key top of the touch key 102 and shifted in a circular motion along the touch key 102, a shifting distance of the finger 130 is detected through the touch sensor 107. And, a CPU (not shown) of a mobile terminal apparatus controls the cursor movement and the like depending on the shifting distance of the finger 130. The touch sensor 107 is a sensor that an electrical value (a resistance value, for example) changes corresponding to the point on which pressure is applied.

As shown in FIG. 15B, the metal domes 106, the metal dome 108 and the touch sensor 107 are arranged side-by-side on a substrate 109.

Meanwhile, the configuration shown in FIG. 15B is common knowledge, however, any documents disclosing the cross-section view of FIG. 15B could not be found.

Further, Patent Document 1 discloses an electronic apparatus that enables a pressing operation of keys and a finger-sliding operation on a touch panel switch by arranging a conductive diaphragm under a pressure-sensitive touch panel switch. In addition, patent document 1 recites that the touch panel switch may be an electrostatic touch panel switch.

Further, Patent Document 2 discloses a user interface device that enables a pressing operation of keys and a cursor operation by arranging key domes beneath a sensing plate.

Patent Document 1: Japanese Patent Application Laid-open No. 2001-76582 (paragraphs 0036, 0038, 0045-0047, 0053 and 0069, FIGS. 2, 3 and 4)

Patent Document 2: Japanese Patent Application Laid-open No. 2002-196856 (paragraphs 0009 and 0011, FIGS. 3 and 4)

In the case where an operation to move a cursor in a certain direction is performed by using the electronic apparatus disclosed in Patent Document 1 or the user interface device disclosed in Patent Document 2, a finger is shifted in a certain direction on the touch panel switch (a sensing plate) and reaches the end of the touch panel switch (a sensing plate). Then, the finger is put back to the initial position so as to be shifted again. That is, whenever the finger reaches the end of the touch panel switch and the like, it is necessary to release the finger from the touch panel switch and the like and put it back to the initial position. It is preferable to move the cursor by a simpler operation without releasing the finger.

Further, in the conventional input device shown in FIG. 15, the selection key 101, the touch key 102 and the four-direction key 103 are provided, and the metal dome 108 corresponding to the selection key 101, the touch sensor 107 corresponding to the touch key 102 and the metal domes 106 corresponding to the four-direction key 103 have to be arranged side-by-side. Therefore, if an area where respective keys are provided is secured sufficiently, size of the input device is required to be enlarged. To avoid that, it is necessary to reduce the area where the selection key 101, the touch key 102 and the four-direction key 103 are provided. However, if the selection key 101, the touch key 102 and the four-direction key 103 are incorporated within the small area, respective keys become in proximity each other. In the result, the finger 130 often touches the touch key 102 and the four-direction key 103 at the same time, which has causes a problem that it is hard for the user to operate the keys.

Moreover, when the finger-sliding operation is performed, it is preferable to be able to obtain a favorable operational feeling. Also, when the finger-sliding operation is performed, it is preferable to be able to detect the shift of the finger with high accuracy.

SUMMARY OF THE INVENTION

It is therefore an object of the present invention to provide an input device, which has no necessity for a finger to be released from keys when an operation of shifting the finger is performed, prevents the finger from touching a plurality of keys at the same time and achieves a favorable operability.

In order to achieve such an object, an input device according to the present invention is a device used for inputting a signal into an electronic apparatus and includes an operation key, metal domes, and a touch sensor. The operation key is switched between a push-button attitude with which the operation key is inclined at an arbitrary position, and a scroll attitude with which the operation key is pressed down along a circumferential direction with the inclined attitude so as to be operated. The metal domes are sensitive to the operation key at the push-button attitude so as to be brought into a conducting state. The touch sensor is sensitive to the operation key at the scroll attitude and an electrical value changes, and further the touch sensor is arranged over the metal domes.

EFFECTS OF THE INVENTION

An input device according to the present invention includes: a disk-shaped key whose four positions of the top, bottom, right and left become push-buttons; metal domes which are arranged at the positions corresponding to four positions of the top, bottom, right and left of the disk-shaped key and are brought into a conducting state when the disk-shaped key is pressed down; a touch sensor which is arranged over the respective metal domes corresponding to four positions of the top, bottom, right and left of the disk-shaped key, and in which an electrical value changes in response to changes of the point on which pressure is applied; and a convex portion for a touch sensor which is provided on the reverse side of the disk-shaped key and applies pressure on the touch sensor when a finger touches the disk-shaped key. Consequently, the disk-shaped key is capable of acting as both a four-direction key and a touch key with which an input operation is performed by shifting the finger in a circular motion. As the touch sensor is arranged over the metal domes, it is possible to enlarge an area of the disk-shaped key. And, when the disk-shaped key is used as the touch key, a simple operation to slide the finger in a continuous circular motion is necessary without releasing the finger from the key. Therefore, a favorable operability can be achieved. Further, as the disk-shaped key acts as both the four-direction key and the touch key, there is no need to provide the four-direction key and the touch key separately, which prevents an erroneous operation or a malfunction caused by touching a plurality of keys at the same time with the finger. In the result, a favorable operability can be achieved. Further, as the touch sensor includes a metal plate, it is capable of improving the reliability for shock or pressure resistance when the disk-shaped key is operated. Moreover, it is possible to prevent the entire touch sensor from bending, to give a user a favorable operational feeling, and to improve operation accuracy.

DESCRIPTION OF EXEMPLARY EMBODIMENTS

Hereinafter, exemplary embodiments of the invention will be explained with reference to the drawings.

FIG. 1 is an illustration diagram showing an input device according to the exemplary embodiment of the invention. The input device of the present invention includes a key 12 (hereinafter referred to as an integrated key) surrounding a selection key 18. The selection key 18 is a key for instructing determination of the item selected by a user. The integrated key 12 is a disk-shaped operation key having a hole in the center for arranging the selection key 18. The integrated key (the operation key) 12 acts as a four-direction key which serves as push-buttons (a push-button attitude) at its four positions of the top, bottom, right and left and as a touch key on which a continuous input operation is performed by shifting a finger in a circular motion. An attitude of the integrated key (the operation key) 12 in which the continuous input operation is performed is called as a scroll attitude, with which the integrated key 12 is pressed down, with inclined, along a circumferential direction around the selection key 18. On the integrated key 12, for example, the operation to instruct cursor movements by shifting the finger in a continuous circular motion is performed. Note that the outline shape of the key 12 is a disk-shape, however, the shape is not limited to that. The outline shape of the key 12 may be a multangular shape approximating a disk-shape. In short, as long as the key 12 being independent of the selection key 18 inclines to the top, bottom, right and left directions, in other words, as long as the key 12 functions as push-buttons at its four positions of the top, bottom, right and left, any shapes may be acceptable. Further, the key 12 is so configured to become a push-button in the case where it inclines to the four positions of the top, bottom, right and left, but positions where the key 12 functions as push-buttons are not limited to the four positions of the top, bottom, right and left. The key 12 may be set to function as push-buttons in the case where the key 12 inclines at positions other than the four positions of the top, bottom, right and left. FIG. 1 shows an example in which the input device according to the exemplary embodiment of the invention is equipped on a mobile terminal apparatus. A display device equipped with the mobile terminal is not shown in FIG. 1. With regard to other keys provided on a housing 11 of the mobile terminal apparatus, the explanation will be omitted. In addition, an application range of the input device according to the exemplary embodiment of the invention is not limited to the mobile terminal apparatus. Any apparatus, which needs to output a plurality of kinds of signals (including ON/OFF) by combining the key 12 and the selection key 18, may be acceptable.

FIGS. 2A and 2B are cross-section views showing the input device according to the exemplary embodiment of the invention. FIG. 2A is a cross-section view of the input device taken along the chain double-dashed line shown in FIG. 1. FIG. 2B is an enlarged view of a region A shown in FIG. 2A.

The input device according to the exemplary embodiment of the invention includes: housings (a first housing 11 and a second housing 21) of a mobile terminal apparatus with which the input device itself is equipped; an integrated key 12; a key rubber 15; four metal domes 14 corresponding to the four positions of the top, bottom, right and left of the integrated key 12; and a touch sensor 13 being a sensor in which an electrical value changes in response to a finger shifted on the integrated key 12 (that is, in response to changes of the point on which pressure is applied). The respective metal domes 14 are arranged on a substrate 41. Further, the input device includes a tape (a sheet) 16 for fixing the metal domes 14 on the substrate 41, and includes a projection (hereinafter referred to as an actuator) 17 at the point corresponding to the tops of the metal domes 14, of the surface of the tape 16 pasted to the metal domes 14. Note that an actuator is an expedient term, so the actuator 17 does not operate electrically and it has only to be provided as a projection. As described above, the positions where the key 12 acts as a push-button are not limited to the four positions of the top, bottom, right and left. If the number of positions where the key 12 acts as push-buttons are increased or decreased, the number of the metal domes 14 are also increased or decreased corresponding to the positions.

Further, a metal dome 31 corresponding to the selection key 18 is provided on the substrate 41. The tape 16 is pasted to the substrate 41 so as to cover not only the four metal domes 14 corresponding to the integrated key 12 but also the metal dome 31 corresponding to the selection key 18, and the tape 16 fixes the metal domes 14 and 31 on the substrate 41. In an example shown in FIG. 2B, respective metal domes 14, the metal dome 31 and the substrate 41 are shown separately from the tape 16 as an expedient, but the tape 16 is pasted to the respective metal domes 14, the metal dome 31 and the substrate 41. In addition, an actuator of the metal dome 31 is not shown in FIG. 2B, but an actuator (a projection) is provided at the point corresponding to the top of the metal dome 31, of the surface of the tape 16.

The key rubber 15 is a rubber member provided on the reverse side of key tops of the integrated key 12 and the selection key 18. The key rubber 15 transmits an operation of the integrated key 12 by the user to the touch sensor 13 and the metal domes 14. The key rubber 15 includes a touch sensor presser (a convex portion) 53 and transmits an operation of the integrated key 12 using the touch sensor presser 53. Specifically, when the integrated key 12 is touched with a finger 130 of the user, it inclines with the selection key 18 as a center. At this time, the touch sensor presser 53 comes into contact with the touch sensor 13, and a touch of the finger 130 of the user on the integrated key 12 is transmitted to the touch sensor 13. Further, when the integrated key 12 is pressed down with the finger 130 of the user, the touch sensor presser 53 of the key rubber 15 also moves to the substrate 41 side along with the integrated key 12. In the result, the top of the metal dome 14 is pressed into the substrate 41 side.

Arrangement position of the touch sensor presser 53 on the key rubber 15 will be explained later.

The key rubber 15 transmits operation of the selection key 18 by the user to the metal dome 31. Specifically, on the surface of the substrate 41 side of the key rubber 15, a convex portion 51 is provided at the part corresponding to the position where the selection key 18 is arranged. Further, a selection key presser 52 is provided on the most pendent face of the convex portion 51. When the selection key 18 is pressed down with the finger 130 of the user, the selection key presser 52 of the key rubber 15 moves to the substrate 41 side along with the selection key 18. In the result, the top of the metal dome 31 is pressed into the substrate 41 side.

The respective metal domes 14 corresponding to the integrated key 12 are metallic dome-shaped members. At the edges of respective metal domes 14, a contact point 14b with the substrate is provided. Also, a contact point 14a is provided on the surface of the substrate 41, at beneath the tops of respective metal domes 14. When the integrated key 12 is pressed down as a button, and the touch sensor presser 53 of the key rubber 15 presses the tops of the metal domes 14 into the substrate 41 side through the touch sensor 13 and the actuator 17, the tops of the metal domes 14 come into contact with the contact point 14a so as to be brought into a conducting state between the contact points 14a and 14b. When a CPU (not shown) of a mobile terminal apparatus detects the conducting state between the contact points 14a and 14b, it performs a processing in the case where the integrated key 12 is pressed down.

The structure of the metal dome 31 corresponding to the selection key 18 is the same as those of the metal domes 14. More specifically, a contact point 31b with the substrate is provided at the outer edge of the metal dome 31. Further, a contact 31a is provided on the surface of the substrate 41, at beneath the top of the metal dome 31. When the selection key 18 is pressed down, and the selection key presser 52 of the key rubber 15 presses the top of the metal dome 31 into the substrate 41 side, the top of the metal dome 31 comes into contact with the contact point 31a so as to be brought into a conducting state between the contact points 31a and 31b. When a CPU (not shown) of a mobile terminal apparatus detects the conducting state between the contact points 31a and 31b, it performs a processing in the case where the selection key 18 is pressed down.

The actuator 17 improves an operational feeling when the user presses down the integrated key 12 as a button and also improves a sensitivity of the metal domes 14 (that is, it makes the tops of the metal domes 14 easy to be in contact with the contact point 14a). By the presence of the actuator 17, it becomes possible to give the user an operational feeling that the user presses the button, and make it easy to bring into a conducting state between the contact points 14a and 14b when the integrated key 12 is pressed down. An actuator (not shown in FIG. 2B) provided at the top of the metal dome 31 has the same role.

Next, the touch sensor 13 will be explained. The touch sensor 13 changes an electrical value depending on the shift of the finger on the integrated key 12. The following will explain an example in the case where a resistance value of the touch sensor 13 changes depending on the shift of the finger 130 on the integrated key 12. As shown in FIG. 2B, there is an open space around the convex portion 51 of the key rubber 15 and between the selection key presser 52 of the convex portion 51 and the touch sensor presser 53 in heightwise. The touch sensor 13 is arranged over the respective metal domes 14 corresponding to the integrated key 12 by using the open space. In this way, in the exemplary embodiment of the invention, the touch sensor 13 is arranged over the respective metal domes 14 corresponding to the integrated key 12. In this point, it is different from a conventional configuration (a configuration in which metal domes and a touch sensor are arranged side-by side on a substrate) shown in FIG. 15B.

The touch sensor 13 includes a metal plate 61 and a FPC (Flexible Printed Circuit) 62 as shown in FIG. 5.

The metal plate 61 is a metal plate, patterned in a disk-shape which has a hole in the center for putting the convex portion 51 of the key rubber 15 (that is, it is a disk-shaped metal plate having a hole in the center). The metal plate 61 puts the convex portion 51 of the key rubber 15 (see FIG. 2B) into the center hole.

FIG. 3 is an illustration diagram showing an example of appearance of the touch sensor 13 observed from the FPC 62 side. The FPC 62 has a hole in the center for putting the convex portion 51 of the key rubber 15 (see FIG. 2B). On the FPC 62, a circular resistive element 65 is patterned. In other words, the circular resistive element 65 is arranged. The resistive element 65 is made of carbon, for example. However, the resistive element 65 may be made of other members. Note that the FPC 62 has a projecting portion 63 used for temporally fixing the touch sensor 13 on the substrate 41 (see FIG. 2B).

Width of the circular resistive element 65 is represented as W. Further, the touch sensor presser 53 (see FIG. 2B) is provided on the key rubber 15 so as to be along a center line 66 of width of the circular resistive element 65 (the part indicated by the dashed line in FIG. 3).

In FIG. 2B, the FPC 62 seems to be in contact with the metal plate 61, as an expedient. However, the touch sensor 13 is formed such that the FPC 62 and the metal plate 61 are not in contact with each other when the finger of the user does not touch the integrated key 12. When the finger touches the integrated key 12, the touch sensor presser 53 presses the FPC 62 into the metal plate 61 side, and the part of the resistive element 65 which corresponding to a contact position of the finger, comes into contact with the metal plate 61.

FIG. 4 is an illustration diagram showing the circular register 65 schematically. One end 68 of the resistive element 65 is connected to an encoder (not shown) for detecting changes of a resistance value of the resistive element 65. The encoder is a resistance value detecting circuit for detecting changes in a resistance value of the resistive element 65 when an electric current is flowing. In addition, the encoder detects the shift of the finger on the integrated key 12 in response to changes in a resistance value of the resistive element 65. A wiring (not shown) drawn from the one end 68 of the resistive element 65 to the edge 69 (see FIG. 3) of the FPC 62 is provided on the FPC 62. A wiring connecting the edge 69 of the FPC 62 and the encoder (not shown) is provided on the substrate 41. The other end 67 of the resistive element 65 is not connected to anywhere. In the state that the edge 67 of the resistive element 65 is not connected to anywhere and that the finger does not touch the integrated key 12, the resistive element 65 does not come into contact with the metal plate 61. Consequently, in the state that the finger does not touch the integrated key 12, an electric current does not pass through the resistive element 65, and the detected resistance value of the resistive element 65 becomes infinity.

FIG. 5 is an illustration diagram showing the state that the FPC is in contact with the metal plate 61. When the finger 130 touches the integrated key 12, the touch sensor presser 53 presses the FPC 62 into the metal plate 61 side, and the part corresponding to a touch position of the finger 130 comes into contact with the metal plate 61, as indicated by a dotted line. In the result, the part of the resistive element 65 corresponding to a touch position of the finger 130, comes into contact with the metal plate 61. Further, the metal plate 61 is arranged so as to be brought into a conducting state when it comes into contact with the resistive element 65. Therefore, when the finger 130 touches the integrated key 12, the one end 68 of the resistive element 65 and the metal plate 61 are brought into a conducting state through the resistive element 65. The encoder (not shown) detects a resistance value of the resistive element 65 at this time.

Meanwhile, the metal plate 61 has a stronger stiffness than the FPC 62. Consequently, the metal plate 61 is capable of improving the reliability for shock or pressure resistance when the integrated key 12 is operated. Moreover, as the metal plate 61 does not bend along with the FPC 62, it is possible to give the user a favorable operational feeling and to prevent the situation that the resistive element 65 does not come into contact with the metal plate 61 even though the finger 130 touches the integrated key 12. In the result, operation accuracy can be improved.

As the resistive element 65 is formed into a circular shape, a resistance value of the resistive element 65 detected in a conducting state changes depending on a touch position of the finger 130 on the integrated key 12. For example, when a position where the finger 130 touches becomes nearer to the one end 68 of the resistive element 65, a resistance value of the resistive element 65, which is detected when the one end 68 of the resistive element 65 and the metal plate 61 are brought into a conducting state, becomes lower. Further, for example, when a position where the finger 130 touches becomes nearer to the other end 67 of the resistive element 65, a resistance value of the resistive element 65, which is detected when the one end 68 of the resistive element 65 and the metal plate 61 are brought into a conducting state, becomes higher. The encoder (not shown) detects the shift of the finger 130 in shifting on the integrated key 12, by changes of a resistance value of the resistive element 65 when the finger 130 touches the integrated key 12 and an electric current passes through the resistive element 65. In this exemplary embodiment, for example, when a detected resistance value of the resistive element 65 increases, the finger 130 of the user on the integrated key 12 is determined that it shifts in clockwise direction. Further, when a detected resistance value of the resistive element 65 decreases, the finger 130 of the user on the integrated key 12 is determined that it shifts in counterclockwise direction. A CPU (not shown) of a mobile terminal apparatus performs a processing depending on the shift of the finger 130 of the user on the integrated key 130, which is determined by the encoder. For example, when the finger 130 of the user is determined that it shifts in clockwise direction, a processing to move a cursor pointing a data list (e.g. a list of music data or image data) displayed on a display device (not shown) in the predetermined direction is performed. Moreover, when the finger 130 of the user is determined that it shifts in counterclockwise direction on the integrated key 12, a processing to move the cursor in the reverse direction is performed.

FIG. 6 is an illustration diagram showing the touch sensor 13 arranged on the substrate 41. Note that an explanation about members, on the substrate, irrelevant to the present invention will be omitted. On the substrate 41, four metal domes 14 corresponding to the integrated key 12 are arranged. The respective metal domes are fixed on the substrate 41 with the tape 16. Further, on the substrate 41, a fixing bracket 263 is provided. The projecting portion 63 (see FIG. 3) of the FPC is temporally fixed with the fixing metal 263, and the touch sensor 13 is in the detached state from the substrate 41. In the result, the touch sensor 13 is arranged over the respective metal domes 14 corresponding to the integrated key 12. In addition, by putting the convex portion 51 of the key rubber 15 (see FIG. 2B) into the center hole of the metal plate 61 and the FPC 62, it prevents the touch sensor 13 from laterally moving and prevents the touch sensor presser 53 from pressing a point other than the position where the resistive element 65 is arranged. In this regard, however, an allowance (a space) is provided between the center hole of the touch sensor 13 and the convex portion 51 of the key rubber 15 (see FIG. 2B). The space will be explained later.

Note that four vertices 91 shown in FIG. 6 are vertices of a circumscribed regular polygon (in this case, a square) which circumscribes the center line of width of the circular resistive element 65.

Next, arrangement positions of four metal domes 14 corresponding to the integrated key 12 will be explained. As shown in FIG. 2B, the metal domes 14 are arranged such that the positions of their tops are out of alignment with arrangement position of the touch sensor presser 53. FIG. 7 is an illustration diagram showing the arrangement positions of the four metal domes 14 corresponding to the integrated key 12. As described above, the touch sensor presser 53 (see FIG. 2B) is provided on the key rubber 15 so as to be along the center line 66 of width of the circular resistive element 65 (the part indicated by the dashed line in FIGS. 3 and 7). The four metal domes 14 corresponding to the integrated key 12 are arranged such that their tops (the positions where the actuator is provided) are located outward than the center line 66 of width of the circular resistive element 65. If the arrangement positions of the tops of the metal domes 14 and the touch sensor presser 53 are coincided, it gives the user who slides the finger in a circular motion an uncomfortable operational feeling that the integrated key 12 moves up and down (with regard to this reason, it will be explained with reference to FIG. 8). In order not to give the user such an uncomfortable operational feeling, the metal domes 14 are arranged such that the tops of respective metal domes are located outward than the centerline 66 of width of the circular resistive element 65.

Based on the standpoint of giving a favorable operational feeling to the user who performs an operation to slide the finger 130 in a circular motion on the integrated key 12, it is preferable to arrange respective metal domes 14 such that the positions of the tops of respective metal domes 14 and the vertices 91 of the circumscribed regular polygon (the circumscribed square) which circumscribes the center line of width of the circular resistive element 65 are overlapped.

Further, if the spaces between the respective metal domes 14 are widen, an area of the substrate 41 on which the metal domes 14 are arranged will become large. And, the positions of the metal domes 14 will be away from the center of the integrated key 12. In the result, when the integrated key 12 is pressed down as a button, the user has an operational feeling that the key is heavy.

Therefore, by comparing and weighing the followings: an uncomfortable operational feeling that the integrated key 12 moves up and down is not given to the user; an area of the substrate 41 on which the metal domes 14 are arranged does not become too large; and an operational feeling that the key is heavy is not given to the user, the arrangement positions of the metal domes 14 may be determined in order to fulfill the conditions as below. The first condition is, as described above, that the tops of respective metal domes 14 are located outward than the center line 66 of width of the circular resistive element 65. The second condition is that the tops of respective metal domes 14 are within a circumscribed regular polygon (a circumscribed square) which circumscribes the center line of width of the circular resistive element 65 (including the vertices of a square being circumscribed). In this regard, however, the square being circumscribed to the center line is determined such that respective vertices of the square being circumscribed to the center line of width of the circular resistive element 65 face respective directions of the top, bottom, right and left of the integrated key 12. The respective metal domes 14 corresponding to the integrated key 12 may be arranged so as to fulfill the two conditions as above.

Next, the reason why the user has an uncomfortable operational feeling when the arrangement positions of the tops of the metal domes 14 and the touch sensor presser 53 are coincided will be explained. FIG. 8 is an illustration diagram indicating this reason. In the case where the arrangement positions of the tops of the metal domes 14 and the touch sensor presser 53 are coincided, as shown in FIG. 8, the tops of respective metal domes 14 overlap with the center line 66 of width of the circular resistive element 65. At this time, if the finger slides in a circular motion on the integrated key 12 (not shown in FIG. 8), the finger will slide like drawing almost the same circle as the center line 66.

When the finger is over the metal domes 14, the position on the integrated key 12 where the finger touches is supported by the metal domes 14. Therefore, the user does not have an operational feeling that the integrated key 12 sinks down.

When the finger slides like drawing almost the same circle as the center line 66 and moves to near a position 71 between the metal domes 14, the position 71 is not supported by the metal domes 14. Further, at this time, the finger is out of the square formed with lines connecting the tops of four metal domes. In this result, the integrated key 12 sinks down.

Further, when the finger slides by drawing almost the same circle as the center line 66 and shifts to over the metal domes 14, the integrated key 12 does not sink down.

Consequently, when the finger slides like drawing almost the same circle as the center line 66, the user has an uncomfortable operational feeling that the integrated key 12 moves up and down. In order not to give the user the uncomfortable operational feeling as described above, the metal domes 14 are arranged such that the first condition that "the tops of respective metal domes 14 are located outward than the center line 66 of width of the resistive element 65" can be fulfilled.

In FIGS. 3 and 4, the resistive element 65 being almost a circle is shown as an example. However, it may be configured that, by providing a plurality of circular resistive elements on the FPC 62, combination of the plurality of resistive elements becomes almost a circle. For example, it may be configured that, by providing four circular resistive elements whose center angles are about 90 degrees on the FPC 62, the four resistive elements are arranged such that the combination becomes almost a circle.

Next, an allowance (a space) between a center hole of the touch sensor 13 and the convex portion 51 of the key rubber 15 (see FIG. 2B) will be explained. Here, the center hole of the touch sensor 13 means a hole having a smaller diameter of a center hole of the FPC 62 and a center hole of the metal plate 61. FIG. 9 is an illustration diagram showing the allowance between the center hole of the touch sensor 13 and the convex portion 51 of the key rubber 15.

The center hole of the touch sensor 13 is circular, and the convex portion 51 of the key rubber 15 is a columnar convex portion. The columnar convex portion 51 is put into the center hole of the touch sensor 13. It becomes difficult to assemble if a diameter of the center hole of the touch sensor 13 and a diameter of the columnar convex portion 51 are equal. Therefore, the diameter of the center hole of the touch sensor 13 is formed so as to be larger than that of the columnar convex portion 51. In this regard, however, by putting the convex portion 51 into the center hole of the touch sensor 13, the touch sensor 13 can be prevented from laterally moving and the touch sensor presser 53 can be prevented from pressing a point other than the position where the resistive element 65 is arranged. Consequently, there is an upper limit for a space (this space is represented as D, see FIG. 9) between the center hole of the touch sensor 13 and the outer circumference of the convex portion 51 when the center of the center hole of the touch sensor 13 and the center of the cross section of the columnar convex portion 51 are lined up.

In the case of coinciding the center of the center hole of the touch sensor 13 with the center of the cross section of the columnar convex portion 51, the space D between the center hole of the touch sensor 13 and the outer circumference of the convex portion 51 is set to be less than a half of width "W" of the resistive element 65. In other words, it will be D<W/2. By determining the space D as described above, even if the touch sensor 13 laterally moves and comes into contact with the convex portion 51, the touch sensor presser 53 is capable of pressing the resistive element 65 against the metal plate 61. That is, it is possible to prevent the situation that the resistive element 65 does not come into contact with the metal plate 61 even though the finger touches the integrated key 12 and the touch sensor presser 53 presses the FPC 62 against the metal plate 61 and also prevent occurrence of a malfunction.

Next, an operation of the input device performed by the user will be explained. As an example, the case where the user performs an operation of pointing the cursor to the desired data from lots of data lists will be explained. A mobile terminal apparatus shows a plurality of data on a display device (not shown).

If the finger of the user touches the integrated key 12 lightly, the integrated key 12 inclines with centering on the selection key 18, and the touch sensor presser 53 comes into contact with the touch sensor 13. And, on the touch sensor 13, the part with which the touch sensor presser 53 is in contact will be ON. The "ON" means the state that the resistive element 65 arranged on the FPC 62 is in contact with the metal plate 61. In the result, an electric current flows from the one end 68 of the resistive element 65 to the metal plate 61 through the resistive element 65, and the detected resistance value of the resistive element 65 changes (the detected resistance value does not become infinity). And then, when the user slides the finger in a continuous circular motion on the integrated key 12, the resistance value detected by the encoder (not shown) changes. The encoder (not shown) detects the shift of the finger (more specifically, a rotative direction and a shifting distance of the finger in a circular motion) on the integrated key 12, in response to changes of the resistance value of the resistive element 65 in a conducting state and outputs it to a CPU (not shown) of a mobile terminal apparatus. The CPU of the mobile terminal apparatus moves the cursor shown on a display device depending on the rotative direction and the shifting distance of the finger in a circular motion on the integrated key 12. When the cursor reaches the end of the display area, a list of data is scrolled and displayed depending on the rotative direction and the shifting distance of the finger. The user has only to slide the finger in a continuous circular motion on the integrated key 12 until the cursor points the desired data.

It is not necessary to release the finger from the key in the operation to slide the finger in a continuous circular motion on the integrated key 12. In the present invention, therefore, the finger shift will be simpler than that achieved in the inventions recited in Patent document 1 or Patent document 2, and higher operability can be achieved.

Moreover, if the user press down any position of the top, bottom, right and left of the integrated key 12 with a power more than a buckling power of the metal domes 14 (a power to deform the tops of the metal domes 14 so as to press toward the substrate 41), the integrated key 12 inclines and the touch sensor presser 53 presses the tops of the metal domes 14 into the substrate 41 through the touch sensor 13. In other words, by the incline of the integrated key 12, the touch sensor presser 53 provided on the reverse side of the integrated key 12 presses the touch sensor 13 into the substrate side. In the result, the reverse side of the touch sensor 13 (the surface of the substrate 41 side) presses the actuator 17 into the substrate 41 side, and then the tops of the metal domes 14 are pressed into the substrate 41 side. Then, the tops of the metal domes 14 come into contact with the contact 14a so as to be brought into a conducting state between the contact points 14a and 14b. When a CPU (not shown) of a mobile terminal apparatus detects the conducting state between the contact points 14a and 14b, it performs a processing in the case where the integrated key 12 is pressed down as a button. Therefore, it becomes possible to perform an operation to press down any position of the top, bottom, right and left of the integrated key 12 as a button. Further, as the actuator 17 is provided on the tops of the metal domes 14, buckling of the metal domes 14 is stabilized, which can give the user a favorable operational feeling.

Next, effects of the present invention will be explained.

The input device according to the present invention is so configured that the disk-shaped integrated key 12 is included and the touch sensor 13 is arranged over the respective metal domes 14 corresponding to the integrated key 12. And, the integrated key 12 acts as a four-direction key, which becomes a push-button at its four positions of the top, bottom, right and left, and as a touch key on which an input operation is performed by shifting the finger in a circular motion. In the result, it becomes possible to enlarge an area of the integrated key 12. Therefore, a favorable operability by using the integrated key 12 can be achieved. More specifically, in the case where the integrated key 12 is used as a touch key, the user has only to perform a simple operation to slide the finger in a continuous circular motion on the integrated key 12, and there is no need to release the finger from the key. Consequently, in the present invention, the finger shift will be simpler than that in the case of an invention recited in Patent document 1 or Patent document 2, and a higher operability can be achieved. Therefore, an operation to move the cursor and to scroll the data list can be achieved lightly. Further, an operation to move the cursor and to scroll the data list can be achieved at higher speed than the conventional operation. These effects are especially obtained when the user performs an operation to point the cursor to the desired data from lots of data (for example, lots of music data or image data).

Further, it is possible to solve a problem caused by the conventional configuration that the finger touches two keys at the same time as shown in FIG. 15. That is, because the four-direction key and the touch key are not provided separately as the conventional configuration shown in FIG. 15, it is possible to enlarge an area of the integrated key 12 included in the present invention and prevent the finger from touching a plurality of keys having a small area at the same time, which is a cause of an erroneous operation or a malfunction.

Further, the touch sensor 13 is capable of detecting the shift of the finger, so the user has only to touch the integrated key 12 with the finger lightly and to shift the finger. Consequently, it can prevent the finger from being tired.

Further, the integrated key 12 acts as the four-direction key, which becomes a push-button at its four positions of the top, bottom, right and left. Therefore, a delicate input operation, which is the same as an operation using the conventional four-direction key, can be achieved. That is, a variety of input operation, which is the same as an operation using the conventional four-direction key, can be achieved.

Further, the actuator 17 (a projection) is provided at the position corresponding to the tops of the metal domes 14, on a surface of the tape 16 pasted to the metal domes 14 in order to fix the metal domes 14 on the substrate 41. Therefore, it is possible to stabilize buckling of the metal domes 14 and give the user a favorable operational feeling. In other words, by the presence of the actuator 17, it is possible to give the user the operational feeling that the user presses the button and to make it easy to bring into a conducting state between the contact points 14a and 14b when the integrated key 12 is pressed down.

Moreover, the projecting portion 63 of the touch sensor 13 (see FIG. 3) is temporally fixed with the fixing bracket 263 on the substrate 41. The touch sensor 13 is arranged so as to be located over the respective metal domes 14 corresponding to the integrated key 12. When an entire keypad (the selection key 18, the integrated key 12 and the key rubber 15) is finally incorporated, the convex portion 51 of the key rubber 15 is put into a circular hole provided in the center of the touch sensor 13. In the result, it is possible to prevent the touch sensor 13 located over the respective metal domes 14 from moving laterally and prevent a malfunction caused by position misalignment of the touch sensor 13.

Especially, by setting the space D between the center hole of the touch sensor 13 and the outer circumference of the convex portion 51 in the case of coinciding the center of the center hole of the touch sensor 13 with the center of the cross section of the columnar convex portion 51 (see FIG. 9) to less than a half of width "W" of the resistive element 65 (see FIG. 3), even if the touch sensor 13 moves laterally and comes into contact with the convex portion 51, the touch sensor presser 53 is capable of pressing the resistive element 65 against the metal plate 61. In the result, when the FPC 62 is pressed against the metal plate 61, it becomes possible to bring the resistive element 65 into a conducting state and prevent a malfunction.

Further, the touch sensor 13 includes the FPC 62 and the metal plate 61, and the metal plate 61 has stiffness. Therefore, it is possible to improve the reliability for shock or pressure resistance when the integrated key 12 is operated. Moreover, as the metal plate 61 does not bend together with the FPC 62, it is possible to give the user a favorable operational feeling and prevent the situation that the resistive element 65 does not come into contact with the metal plate 61 even though the finger 130 touches the integrated key 12. In the result, operation accuracy can be improved.

Further, in order to fulfill the condition that the tops of respective metal domes 14 are located outward than the center line 66 of width of the circular resistive element 65, the respective metal domes 14 are arranged on the substrate 41. Therefore, it is possible to prevent from giving the user an uncomfortable operational feeling that the integrated key 12 moves up and down.

Moreover, in order to fulfill the condition that the tops of respective metal domes 14 are located within a square being circumscribed to the center line of width of the circular resistive element 65, the respective metal domes 14 are arranged on the substrate 41. Therefore, it is possible to prevent an area where the metal domes 14 are arranged from enlarging. Further, it is possible to give the user a favorable operational feeling without making the user feel the weight of the key when the integrated key 12 is pressed down.

Further, in the exemplary embodiment as described above, the case that the touch sensor 13 is a pressure-sensitive touch sensor has been explained. However, the touch sensor 13 may be an electrostatic touch sensor.

Further, in the exemplary embodiment as described above, the case that the actuator 17 is provided on the surface of the tape 16 pasted to the metal domes 14 has been explained. Instead of providing the actuator 17 on the surface of the tape 16, the convex portion may be provided on the metal plate 61 of the touch sensor 13. This convex portion may be formed at the position facing the tops of the metal domes 14. In addition, the convex portion provided on the metal plate 61 may be a punctuate convex portion or a ring convex portion. By providing the convex portion on the metal plate 61 instead of the tape 16, it becomes possible to enhance the durability.

Further, a component which contains the metal domes 14, 31 and the touch sensor 13 may be formed by using a member for housing the metal domes 14, 31 and the touch sensor 13. FIG. 10 is an illustration diagram showing a configuration example in the case where the metal domes 14, 31 and the touch sensor 13 are combined so as to be one component. The same parts as that shown in FIG. 2 are given the same symbols as that in FIG. 2, and the explanation will be omitted.

On a first member 96 shown in FIG. 10, the metal domes 14 and 31 are arranged. Further, the touch sensor 13 is arranged over the metal domes 14. A second member 95 holds the touch sensor 13 arranged over the metal domes 14 from the outer circumference side of the touch sensor 13. The first member 96 and the second member 95 are bonded each other, and the metal domes 14, 31 and the touch sensor 13 are housed between the first member 96 and the second member 95. The first member 96 and the second member 95 are packages for housing the metal domes 14, 31 and the touch sensor 13. The first member 96 and the second member 95 may be made of plastic, for example. However, they may be made of any other material.

FIG. 11 is a cross-section view showing the first member 96 and the second member 95. In this regard, however, the metal dome (the metal dome 31 corresponding to the selection key 18) arranged in the center of the first member 96 is not shown in FIG. 11. As described above, respective metal domes are arranged on the first member 96, and the touch sensor 13 is arranged over that. Further, the second member 95 is bonded to the first member 96 so as to hold the touch sensor 13 from the circumference side of the touch sensor 13. Alternatively, firstly the touch sensor 13 may be housed in the second member 95 and then the first member 96 to which the metal domes are pasted may be bonded to the second member 95.

Further, the first member 96 may be formed into a circular shape. And, the second member 95 may be formed into a hollow columnar shape. In this case, one end of the second member 95 is formed so as to face inward, and the part formed to face inward holds the touch sensor 13 from the outer circumference side of the touch sensor 13. FIG. 12 is an external view showing the touch sensor 13 and the like observed from the second member 95 side in the case where the second member 95 is a hollow columnar shape. The metal domes 14 are arranged on the first member 96 which is circular. However, as the metal domes 14 are covered with the touch sensor 13 and the second member 95, the metal domes 14 are not visible. In addition, the center hole of the touch sensor 13 can be visible. However, as the outer circumference of the touch sensor 13 is covered with the second member 95, it is not visible. As shown in FIG. 12, the metal domes and the touch sensor 13 are housed in the first member 96 and the second member 95 so as to be formed as one component.

Moreover, as shown in FIG. 12, in the case where a hollow columnar shaped member in which the one end faces inward is used as the second member 95, the second member 95 covers entire outer circumference of the touch sensor 13. In this case, a rim surrounding the part formed to face inward may be provided and be in contact with the key rubber 15. FIG. 13 is a cross-section view showing a configuration example in the case where the rim is provided on the second member 95. Note that the convex portion 51 of the key rubber 15 is not shown in FIG. 13. By the configuration that a rim 201 surrounding the part of the second member 95 formed to face inward is provided, and the rim 201 is in contact with the key rubber 15, it becomes possible to prevent dust from coming in a space surrounded by the key rubber 15, the first member 96 and the second member 95.

Further, the first member 96 may be formed into a cross shape. FIG. 14 is an illustration diagram showing an example in the case where the first member 96 is formed into a cross shape. Four metal domes 14 corresponding to the integrated key 12 are arranged near respective ends of the first member 96 being a cross shape. In this case, four members as the second member 95 are provided, and the respective second members 95 are formed into nearly a L-shape. The respective second members 95 are bonded to respective ends of the first member 96 being a cross shape so as to hold the touch sensor 13 from the outer circumference side of the touch sensor 13. In this example, the entire outer circumference of the touch sensor 13 is not always covered with the second members 95.

As described in FIGS. 10 to 14, when a component which contains the metal domes and the touch sensor 13 is formed by using the first member 95 and the second member 95, the component may be arranged on the substrate 41. Therefore, it is possible to improve an assembling efficiency.

Further, in the case where the first member 96 shall be a cross shape, it is possible to narrow an area where the first member 96 occupies on the substrate 41.

The input device according to the present invention is capable of being used as an input device of an electronic apparatus such as a mobile phone which stores lots of data. In addition, it is capable of being applied to not only a mobile phone but also an operation panel of a downsized electrical appliance. For example, it is possible to apply to an operating section of a music player, a multimedia player, a digital camera, a video camera, a PDA and a small mobile personal computer. Moreover, it is possible to apply to an operation panel or a remote controller of a home or car audio equipment.

Next, other exemplary embodiments of the invention will be explained.

The input device with which an input operation to an electronic apparatus is performed may include: a disk-shaped key (the integrated key 12, for example) which becomes a push-button at its four positions of the top, bottom, right and left; metal domes (the metal domes 14 corresponding to the integrated key 12, for example) which are arranged at the positions corresponding to four positions of the top, bottom, right and left of the disk-shaped key and are brought into a conducting state when the disk-shaped key is pressed down; a touch sensor (the touch sensor 13, for example) which is arranged over the respective metal domes corresponding to four positions of the top, bottom, right and left of the disk-shaped key and in which an electrical value changes in response to changes at the point on which pressure is applied; and a convex portion for a touch sensor (the touch sensor presser 53, for example) which is provided on the reverse side of the disk-shaped key and applies pressure on the touch sensor when a finger touches the key. The touch sensor may be so configured to include a flexible printed circuit board (the FPC 62, for example) on which a circular resistive element (the resistive element 65, for example) is provided and a metal plate (the metal plate 61, for example) which comes into contact with the resistive element so as to allow the resistive element to be in a conducting state when the convex portion for a touch sensor is pressed against the flexible printed circuit board.

The convex portion for a touch sensor may be provided along the center line of width of the circular resistive element, and the metal domes corresponding to four positions of the top, bottom, right and left of the disk-shaped key may be arranged such that the tops of respective metal domes are located outward than the centerline of width of the circular resistive element. According to such a configuration, when the finger slides in a circular motion on the disk-shaped key, it is possible to prevent from giving the user an uncomfortable operational feeling that the disk-shaped key moves up and down.

The metal domes corresponding to four positions of the top, bottom, right and left of the disk-shaped key may be arranged such that the tops of respective metal domes are within a square being circumscribed to the center line of width of the circular resistive element. According to such a configuration, it is possible to prevent an area where the metal domes are arranged from enlarging. Further, it is possible to prevent the user from feeling that the key is heavy when the user presses down the disk-shaped key.

The metal domes corresponding to four positions of the top, bottom, right and left of the disk-shaped key may be arranged such that the tops of respective metal domes and the vertices of the square being circumscribed to the center line of width of the circular resistive element are overlapped. According to such a configuration, when the finger slides in a circular motion on the disk-shaped key, it is possible to minimize an uncomfortable operational feeling that the disk-shaped key moves up and down.

A rubber member (a key rubber 15, for example) including a convex portion for a touch sensor may be provided on the reverse side of the disk-shaped key. The rubber member may include a columnar center convex portion (a convex portion 51, for example) at the position corresponding to the center of the disk-shaped key. The touch sensor may include a hole for putting the center convex portion in the center of the touch sensor. According to such a configuration, it is possible to prevent the touch sensor from moving laterally and to prevent a malfunction caused by position misalignment of the touch sensor.

The space between the center hole of the touch sensor and the outer circumference of the center convex portion in the case of coinciding the center of the center hole of the touch sensor with the center of the cross section of the center convex portion may be less than a half of width of the resistive element. According to such a configuration, even if the touch sensor laterally moves and comes into contact with the center convex portion, the convex portion for a touch sensor is capable of bring the resistive element into contact with the metal plate and preventing a malfunction.

A package for housing the metal domes corresponding to four positions of the top, bottom, right and left of the disk-shaped key and the touch sensor may be included. According to such a configuration, it is possible to form a component in which the metal domes and the touch sensor are included, so an assembling efficiency of an input device can be improved.

Meanwhile, the exemplary embodiments described above are just examples embodying the present invention. It may be modified within effect of the present invention disclosed in the claims.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

The present invention is applied as an input device of electronic apparatuses such as a mobile phone, a music player, a multimedia player, a digital camera, a video camera, a PDA, a small mobile personal computer and audio equipment.

Figure 1:
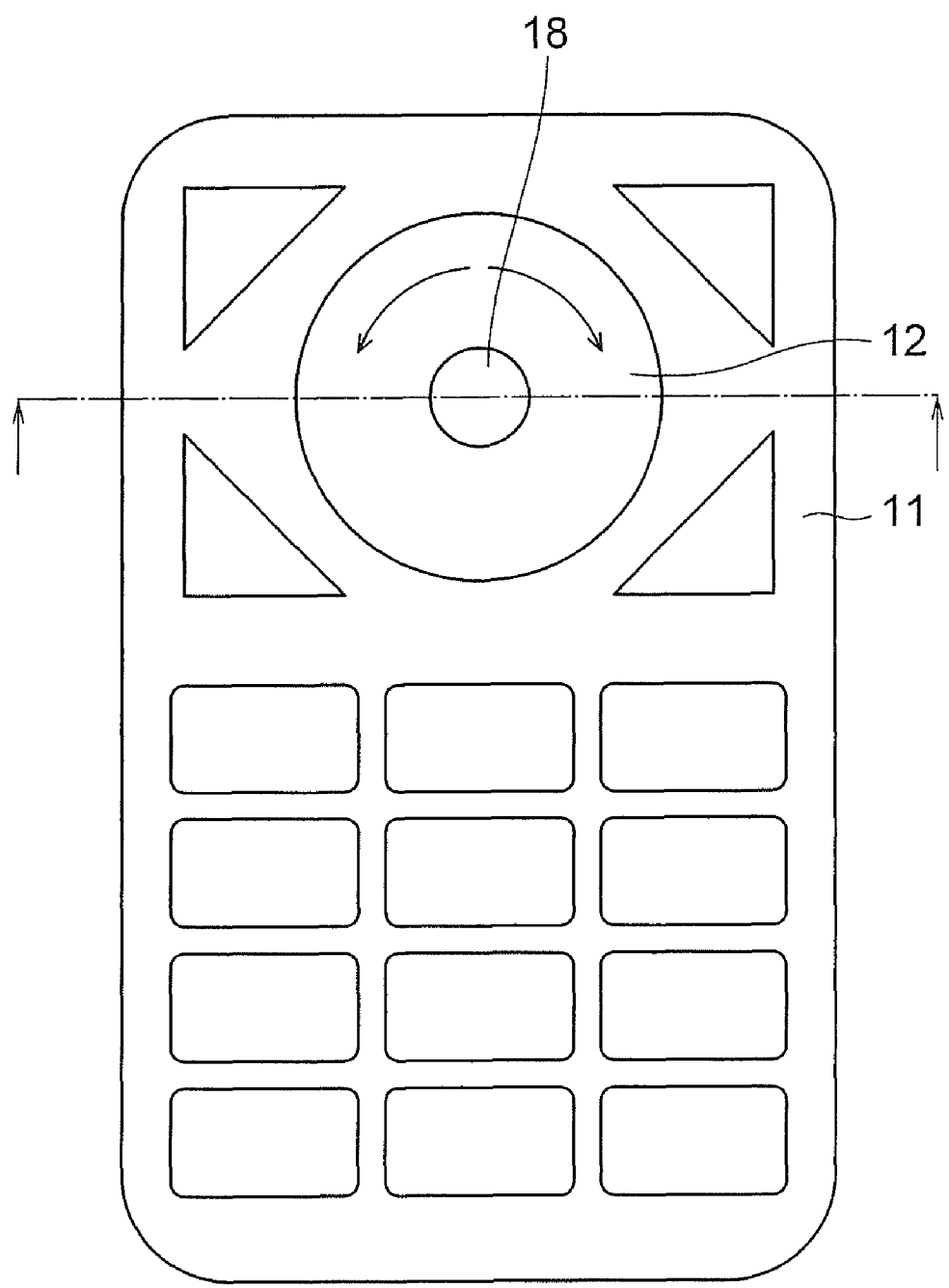
FIG. 1 is an illustration diagram showing an input device according to the present invention.
Figure 2A:
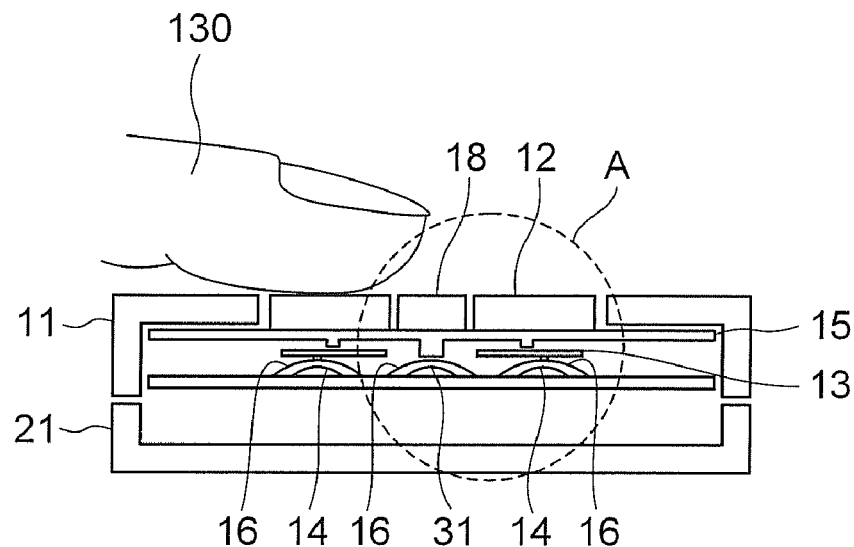
FIG. 2 is a cross-section view showing the input device according to the present invention.
Figure 2B:
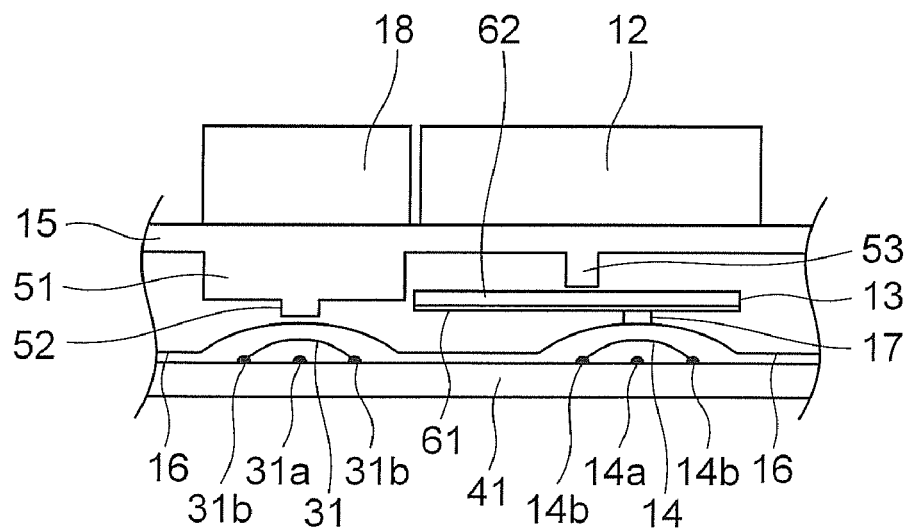
Figure 3:
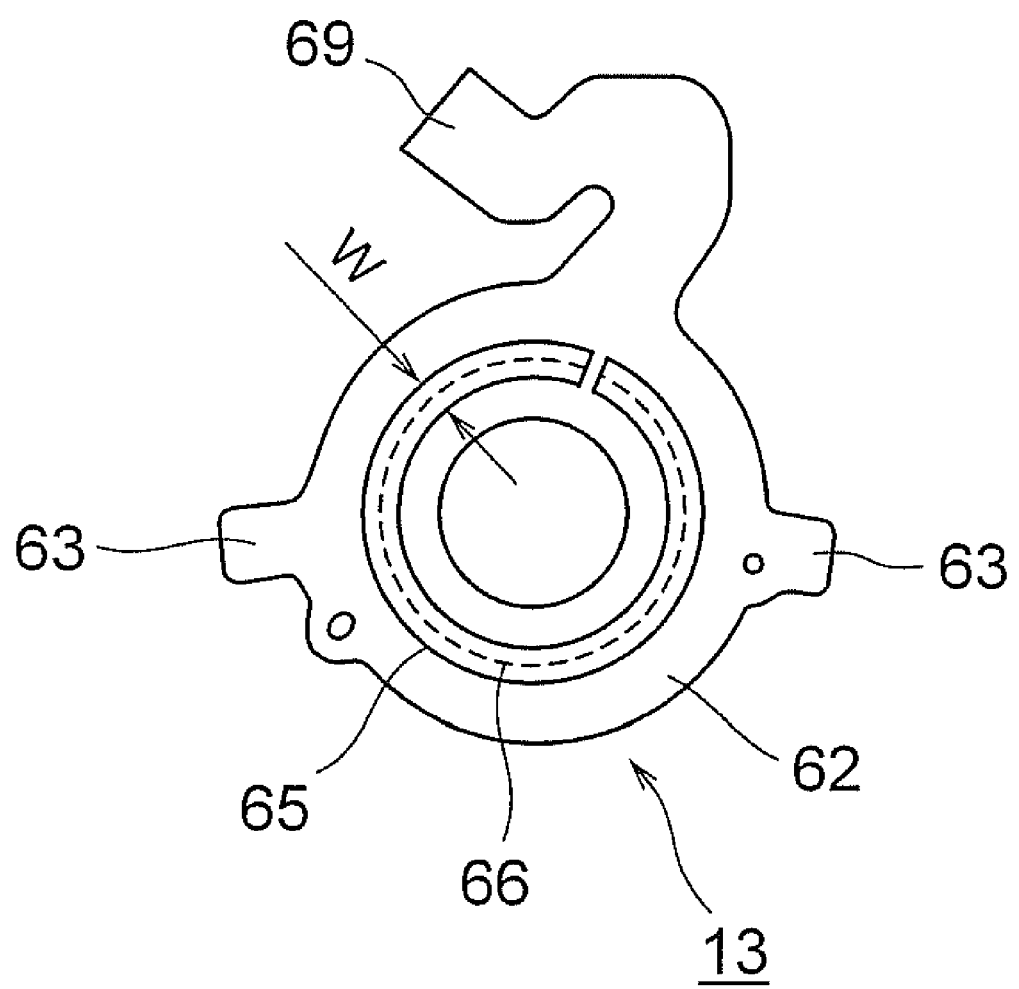
FIG. 3 is an illustration diagram showing an example of appearance of a touch sensor observed from a FPC side.
Figure 4:
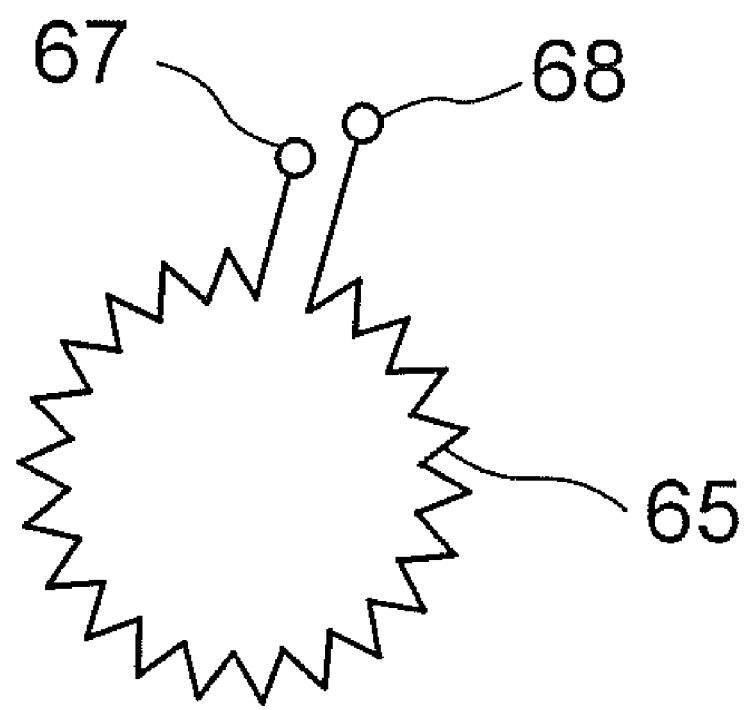
FIG. 4 is an illustration diagram showing a circular resistive element schematically.
Figure 5:
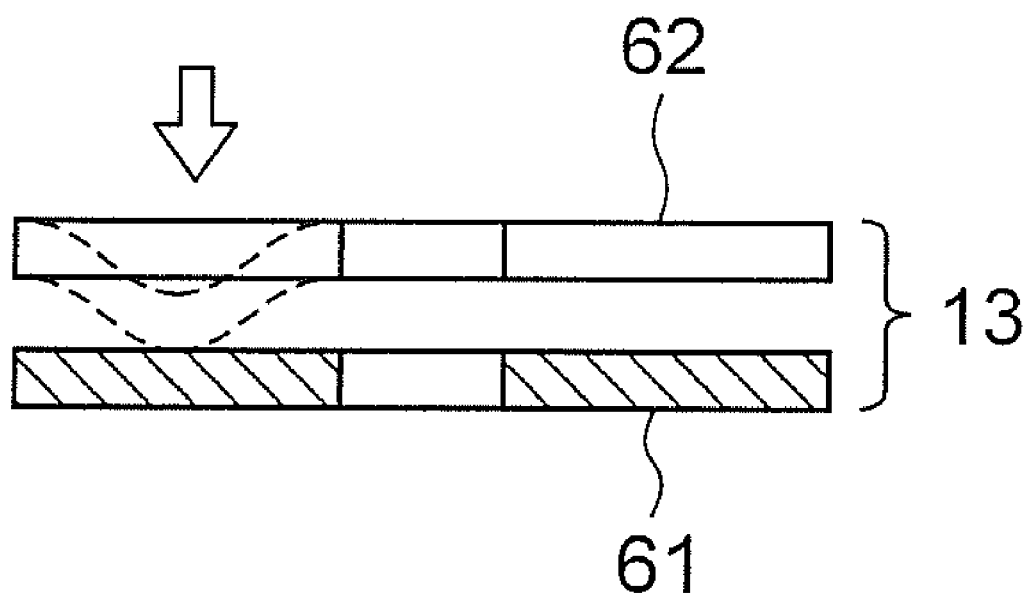
FIG. 5 is an illustration diagram showing s state that the FPC is in contact with a metal plate.
Figure 6:
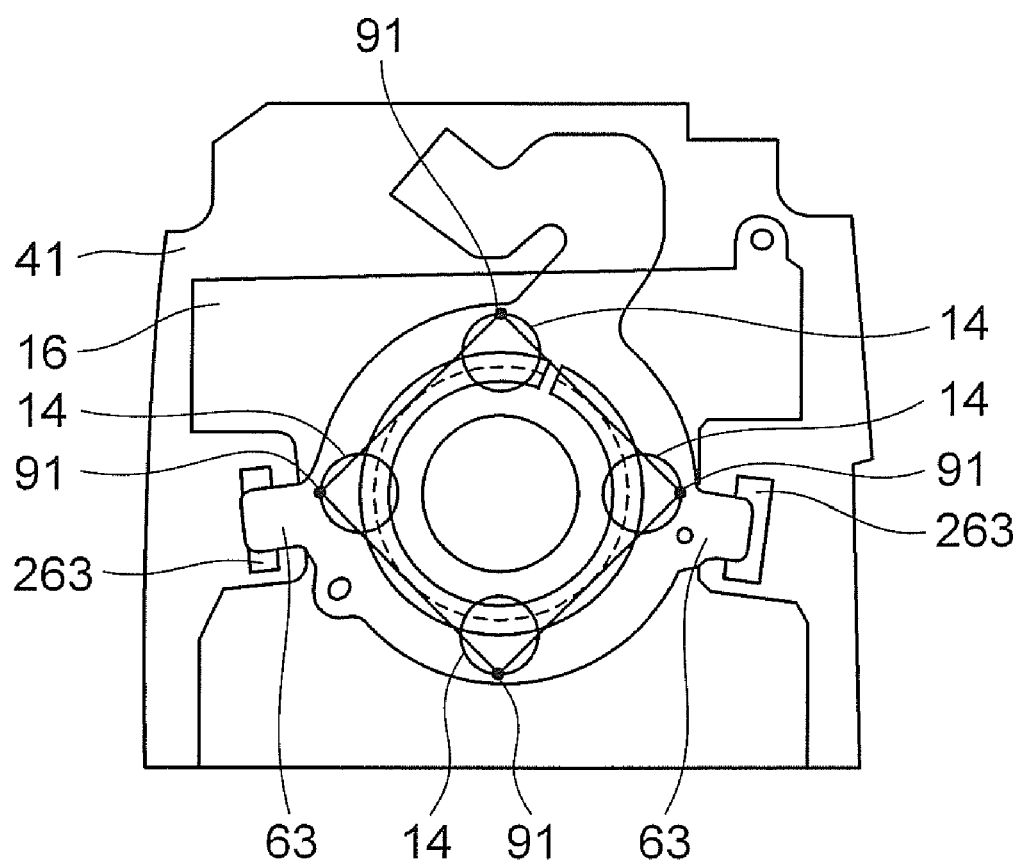
FIG. 6 is an illustration diagram showing the touch sensor arranged on a substrate.
Figure 7:
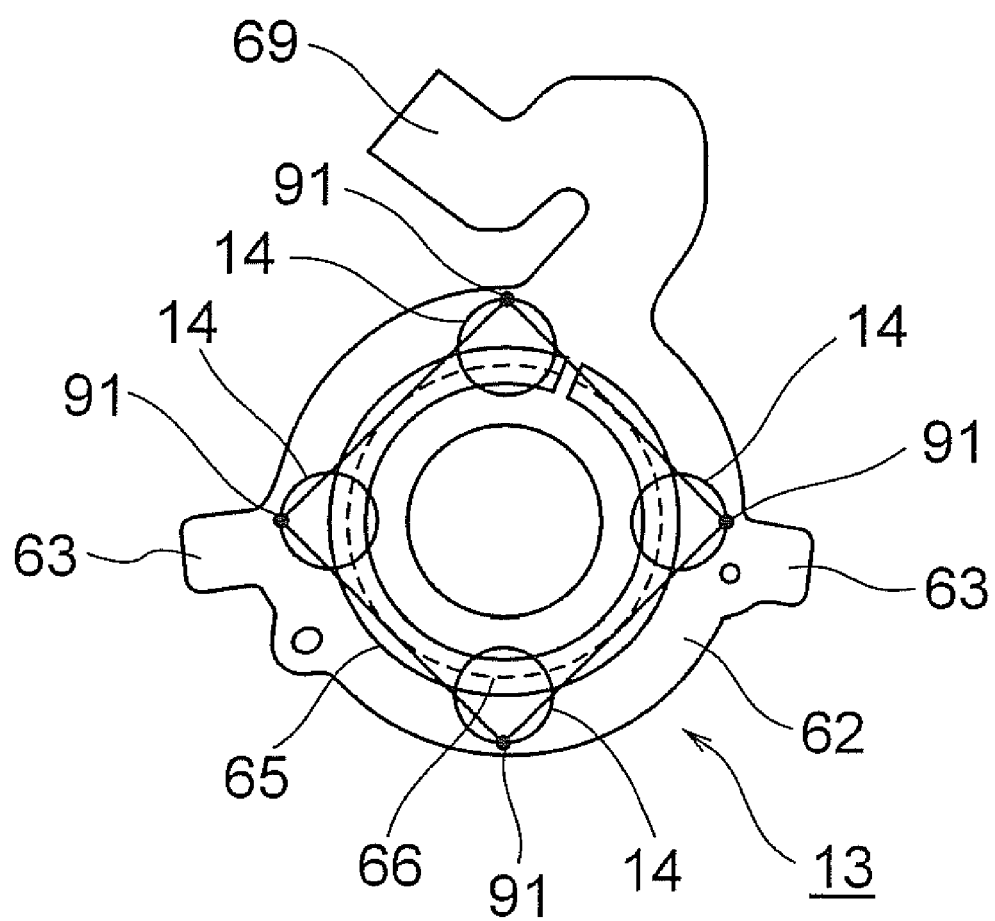
FIG. 7 is an illustration diagram showing an arrangement position of four metal domes corresponding to an integrated key.
Figure 8:
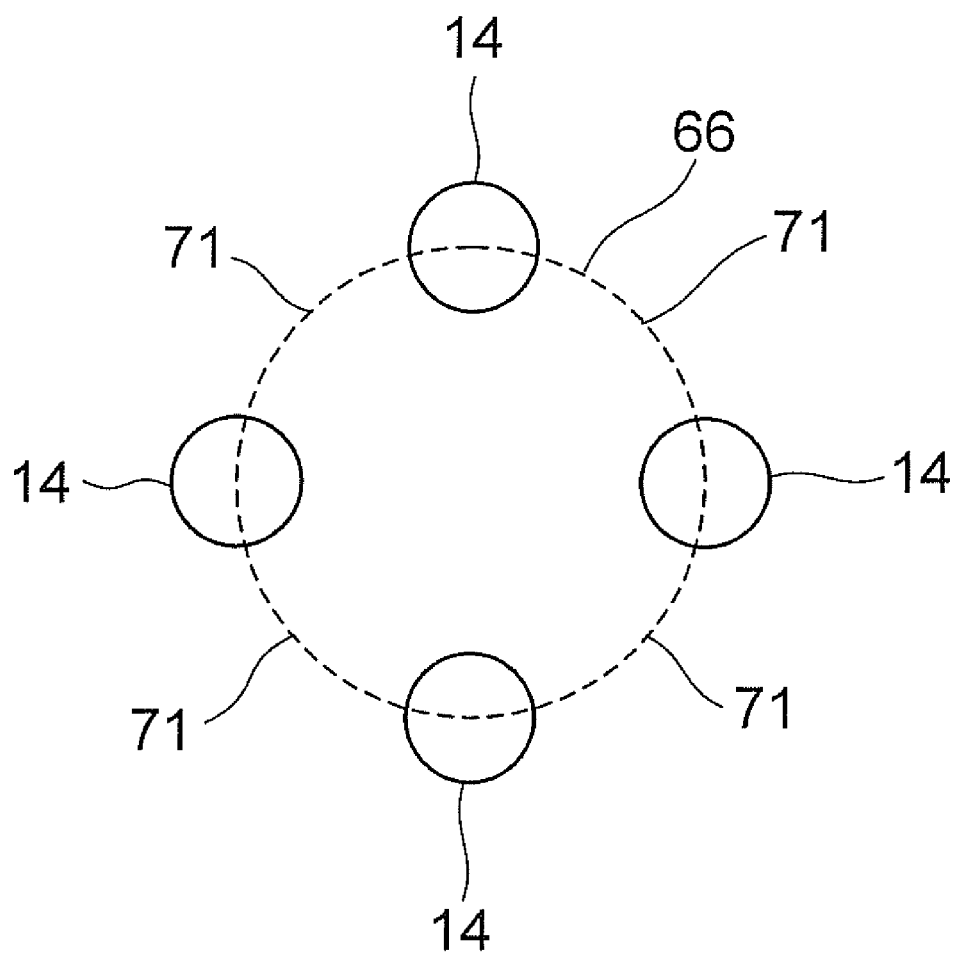
FIG. 8 is an illustration diagram showing the reason for giving the user an uncomfortable operational feeling in the case of coinciding the arrangement positions of the tops of metal domes and a touch sensor presser.
Figure 9:
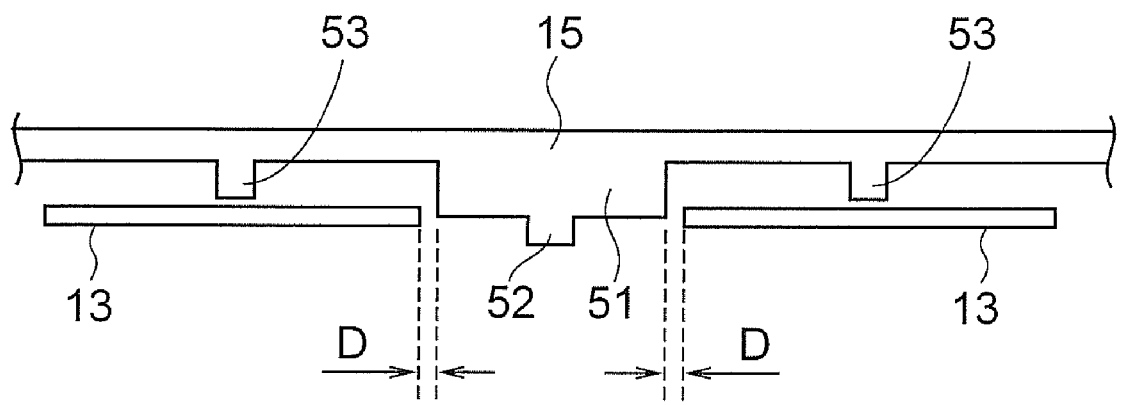
FIG. 9 is an illustration diagram showing allowance between a center hole of the touch sensor and a convex portion of a key rubber.
Figure 10:
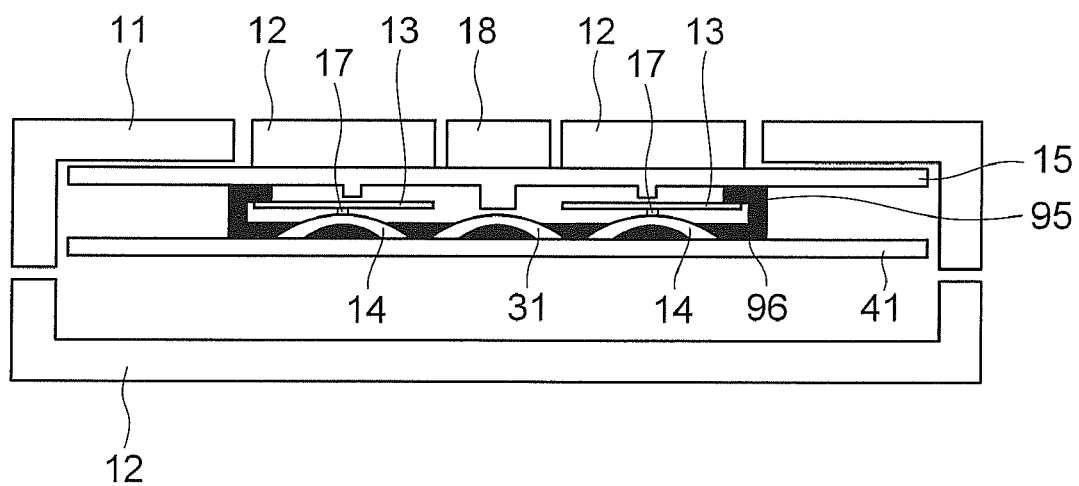
FIG. 10 is an illustration diagram showing a configuration example in the case of forming a component by combining the metal domes and the touch sensor.
Figure 11:
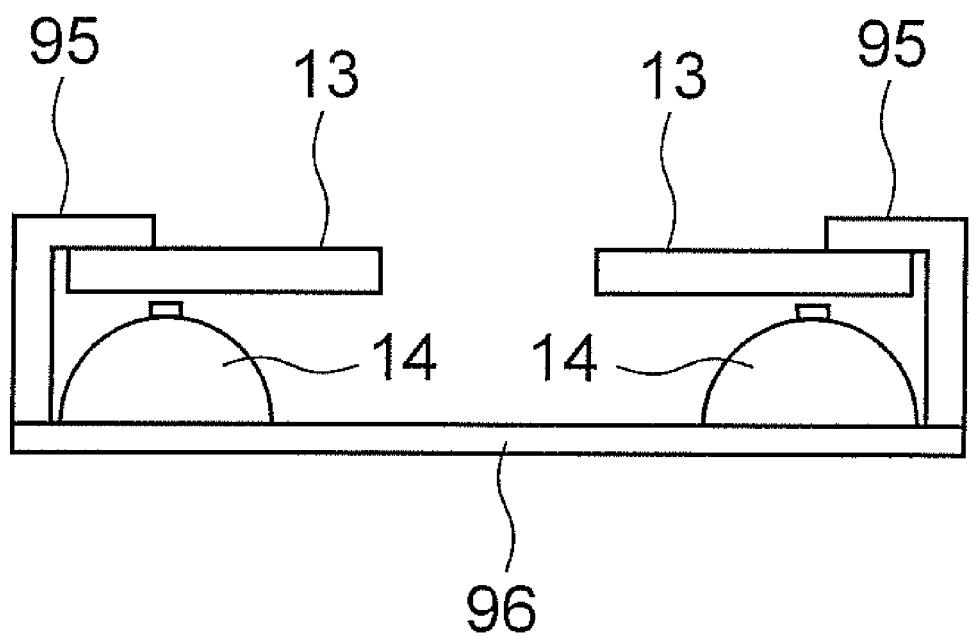
FIG. 11 is a cross-section view showing a first member and a second member.
Figure 12:
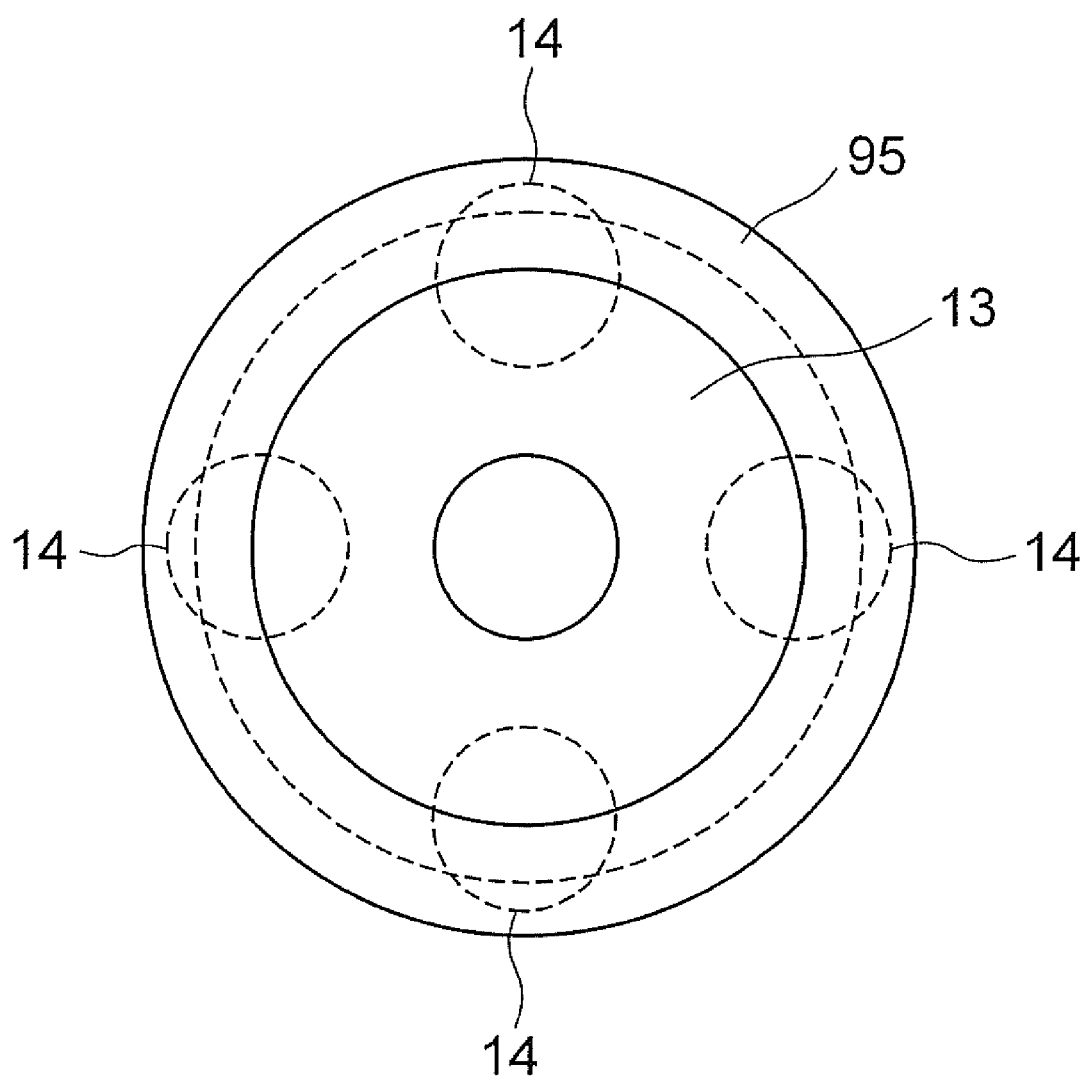
FIG. 12 is an external view showing the touch sensor and the like observed from the second member side in the case where the second member is a hollow columnar shaped member.
Figure 13:
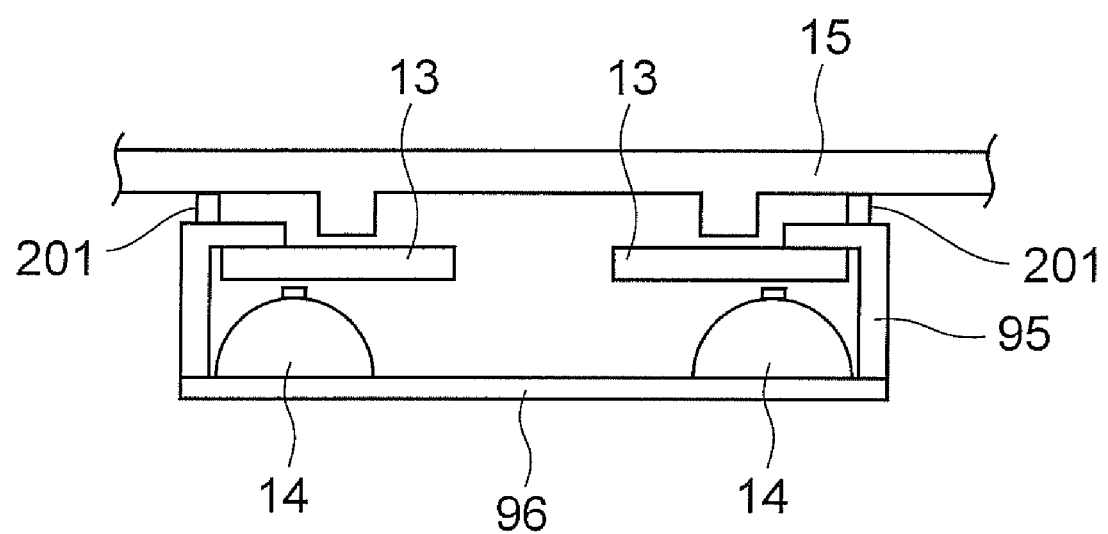
FIG. 13 is a cross-section view showing a configuration example in the case where a rim is provided on the second member.
Figure 14:
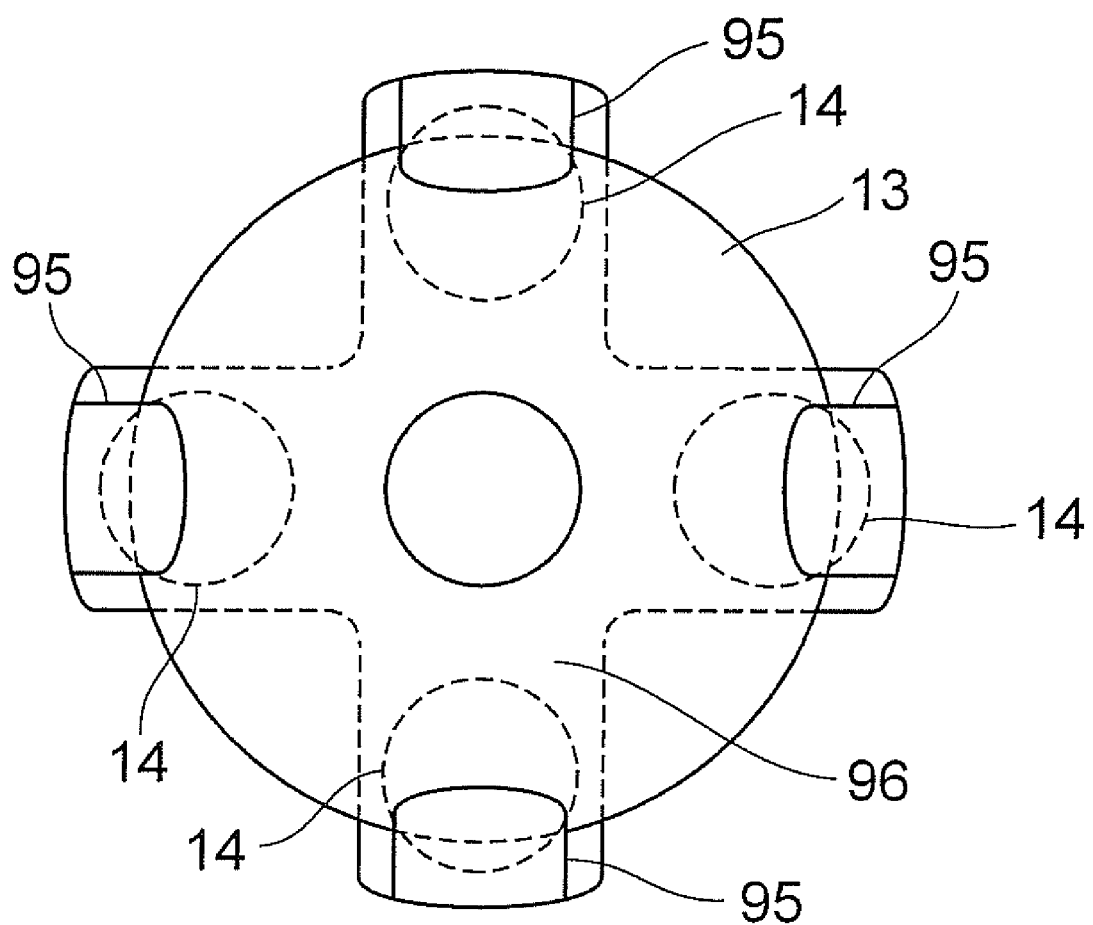
FIG. 14 is an illustration diagram showing an example in the case where the first member is formed into a cross shape.
Figure 15A:
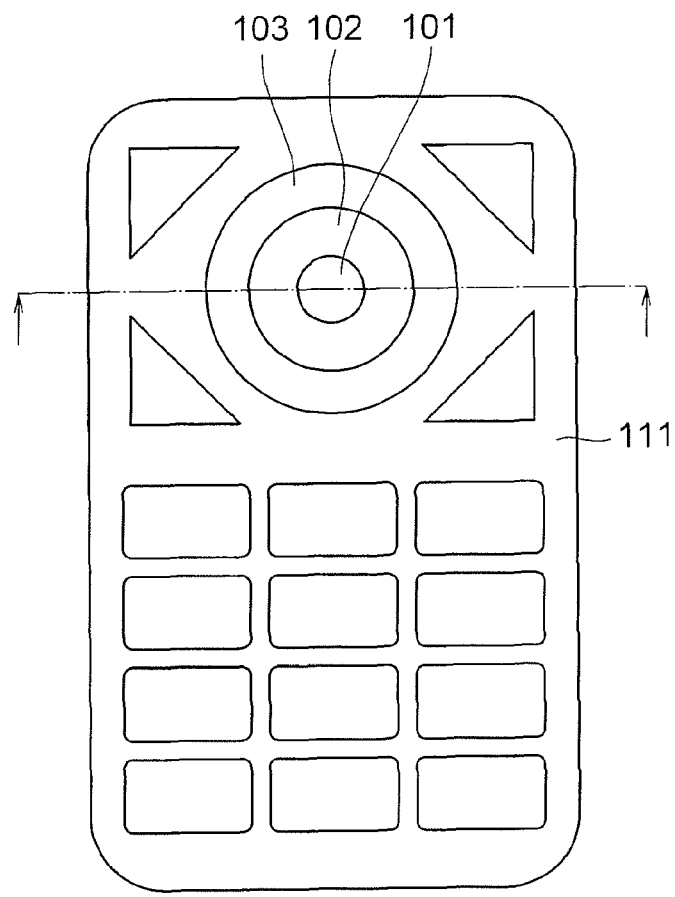
FIG. 15 is an illustration diagram showing an example of a conventional input device equipped with a mobile terminal apparatus.
Figure 15B:
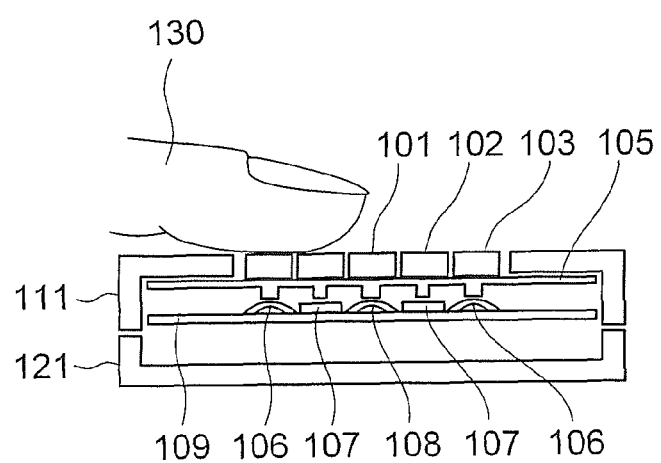

DESCRIPTION OF SYMBOLS 11 first housing
12 integrated key
13 touch sensor
14 metal dome
15 key rubber
16 tape (sheet)
17 projection (actuator)
18 selection key
21 second housing
41 substrate
51 convex portion
52 selection key presser
53 touch sensor presser
61 metal plate
62 FPC (Flexible printed circuit board)
65 resistive element

The invention claimed is:

1. An input device used for inputting a signal into an electronic apparatus, comprising an operation key, metal domes and a touch sensor, wherein
the operation key is switched between a push-button attitude in which the operation key inclines at an arbitrary position and a scroll attitude in which the operation key is pressed down along a circumferential direction with the push-button attitude so as to be operated,
the metal domes are sensitive to the operation key in the push-button attitude so as to be brought into a conducting state,
the touch sensor is sensitive to the operation key in the scroll attitude and an electrical value changes, and further the touch sensor is arranged over the metal domes,
wherein the input device further comprises a convex portion for a touch sensor that is provided on the reverse side of the operation key and applies pressure on the touch sensor when a finger touches the operation key, and
wherein the touch sensor includes:
a flexible printed circuit board on which a circular resistive element is provided; and
a metal plate coming into contact with the resistive element so as to allow the resistive element to be in a conducting state when the convex portion for a touch sensor is pressed against the flexible printed circuit board.

2. The input device as claimed in claim 1, wherein
the convex portion for a touch sensor is provided along a center line of width of the circular resistive element, and
the metal domes are arranged such that the tops of respective metal domes are located outward than the center line of width of the circular resistive element.

3. The input device as claimed in claim 2, wherein the metal domes are arranged such that the tops of respective metal domes are located within a square being circumscribed to the center line of width of the circular resistive element.

4. The input device as claimed in claim 3, wherein the metal domes are arranged such that the tops of respective metal domes are overlapped with vertices of a square being circumscribed to the center line of width of the circular resistive element.

5. The input device as claimed in claim 1, further comprising a rubber member including the convex portion for a touch sensor, wherein
the rubber member includes a columnar center convex portion at a position corresponding to the center of a disk-shaped key, and
the touch sensor is provided with a hole for putting the center convex portion into the center of the touch sensor.

6. The input device as claimed in claim 5, wherein a space between the center hole of the touch sensor and the outer circumference of the center convex portion in the case of coinciding the center of the center hole of the touch sensor with the center of the cross section of the center convex portion is less than a half of width of the resistive element.

7. The input device as claimed in claim 1, wherein at least the operation key, the metal domes and the touch sensor are included in a package.

8. Input means for inputting a signal into an electronic apparatus, comprising an operation key, metal domes and a touch sensor, wherein
the operation key is switched between a push-button attitude in which the operation key inclines at an arbitrary position and a scroll attitude in which the operation key is pressed down along a circumferential direction with the push-button attitude so as to be operated,
the metal domes are sensitive to the operation key in the push-button attitude so as to be brought into a conducting state,
the touch sensor is sensitive to the operation key in the scroll attitude and an electrical value changes, and further the touch sensor is arranged over the metal domes,
wherein the input device further comprises a convex portion for a touch sensor that is provided on the reverse side of the operation key and applies pressure on the touch sensor when a finger touches the operation key, and
wherein the touch sensor includes:
a flexible printed circuit board on which a circular resistive element is provided; and
a metal plate coming into contact with the resistive element so as to allow the resistive element to be in a conducting state when the convex portion for a touch sensor is pressed against the flexible printed circuit board.

* * * * *